United States Patent
McHugh et al.

(10) Patent No.: US 10,884,895 B2
(45) Date of Patent: Jan. 5, 2021

(54) CAPTURE OF SOFTWARE ELEMENT STATE CHANGES DURING SOFTWARE APPLICATION RUNTIME AND APPLICATION MODIFICATION BASED ON STATE CHANGES

(71) Applicant: International Business Machines Corporation, Armonk, NY (US)

(72) Inventors: Manus Kevin McHugh, Colorado Springs, CO (US); Kirk Woods, Lathrop, MO (US); Barry Michael Graham, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 16/262,893

(22) Filed: Jan. 30, 2019

(65) Prior Publication Data

US 2020/0242001 A1  Jul. 30, 2020

(51) Int. Cl.
*G06F 11/34* (2006.01)
*G06F 11/00* (2006.01)
(Continued)

(52) U.S. Cl.
CPC ........ *G06F 11/3612* (2013.01); *G06F 11/302* (2013.01); *G06F 11/3089* (2013.01); *G06F 11/3466* (2013.01)

(58) Field of Classification Search
CPC ............. G06F 11/3438; G06F 11/3612; G06F 11/302; G06F 11/3089; G06F 11/3466;
(Continued)

(56) References Cited

U.S. PATENT DOCUMENTS 5,724,505 A  3/1998 Argade et al.
6,026,235 A  2/2000 Shaughnessy
(Continued)

FOREIGN PATENT DOCUMENTS

WO  2017097878 A1  6/2017

OTHER PUBLICATIONS

Li et al., Symbolic state validation through runtime data, 11 pages (Year: 2014).*
(Continued)

*Primary Examiner* — Thuy Dao
(74) *Attorney, Agent, or Firm* — North Shore Patents, P.C.; Michele Liu Baillie

(57) ABSTRACT

In capturing software element state changes during software application runtime, a computing device executes a software application that a set of software sensors integrated within executable code of the software application. The software sensors correspond to software elements in the software application. During runtime, a given software sensor corresponding to a given software element continuously determines whether the given software element changes state. In response to a change in state, the given software sensor captures and stores the current state of the given software element. An application control module associated with the software application obtains state data stored by the software sensors. The application control module determines commands for modifying a behavior of the software application based on an analysis of the state data and executes the commands.

18 Claims, 5 Drawing Sheets

(51) Int. Cl.
*G06F 11/36* (2006.01)
*G06F 11/30* (2006.01)
*G06F 9/30* (2018.01)

(58) Field of Classification Search
CPC ............... G06F 3/04817; G06F 3/0482; G06F 3/04883; G06F 3/0488; G06F 3/017; G06F 8/61; G06F 8/62; G06F 9/4451; G06F 8/443; G06F 9/45516; G06F 11/1405; H04L 41/22; H04L 41/5009; H04L 41/5032; H04L 67/38
See application file for complete search history.

(56) References Cited

U.S. PATENT DOCUMENTS

| | | | |
|---|---|---|---|
| 6,775,827 B1 | 8/2004 | Harkins | |
| 6,862,696 B1* | 3/2005 | Voas | G06F 11/3466 714/38.11 |
| 7,661,094 B2 | 2/2010 | Blevin et al. | |
| 8,468,502 B2 | 6/2013 | Lui et al. | |
| 8,495,587 B2 | 7/2013 | Bittles et al. | |
| 8,839,265 B2* | 9/2014 | Jacobson | G06F 9/4555 719/310 |
| 9,497,572 B2 | 11/2016 | Britt et al. | |
| 9,600,394 B2* | 3/2017 | Salunke | G06F 11/3612 |
| 9,836,347 B2* | 12/2017 | McChord | G06F 11/1484 |
| 9,882,969 B2* | 1/2018 | Reddy | G06F 8/61 |
| 10,616,078 B1* | 4/2020 | Thomas | G06F 11/3466 |
| 2005/0182750 A1* | 8/2005 | Krishna | G06F 11/3438 |
| 2006/0136902 A1* | 6/2006 | Monroe | G06F 8/60 717/170 |
| 2009/0320021 A1* | 12/2009 | Pan | G06F 11/0715 718/100 |
| 2017/0255455 A1* | 9/2017 | Collier | G06F 8/61 |

OTHER PUBLICATIONS

"Debugger", Wikipedia, Nov. 24, 2018.
"Internet of things", Wikipedia, Jan. 25, 2019.
"List of debuggers", Wikipedia, Jan. 12, 2019.
"Smart object", Wikipedia, Nov. 7, 2018.
"What is the anatomy of IoT sensor Devices?", IoT One, retrieved from [http://www.iotone.com/guide/what-is-the-anatomy-of-iot-sensor-devices/g490] on Jan. 25, 2019.
Fruehi, John, "The Internet of Things is About Data, Not Things", Moor Insights and Strategy, retrieved from [https://www.forbes.com/sites/moorinsights/2015/07/30/the-internet-of-things-is-about-data-not-things/#2cbcf36927cf] on Jan. 25, 2019.
Ko, JeongGil, et al., "Sensor Virtualization Module: Virtualizing IoT Devices on Mobile Smartphones for Effective Sensor Data Management", International Journal of Distributed Sensor Networks, Oct. 4, 2015.

* cited by examiner

CAPTURE OF SOFTWARE ELEMENT STATE CHANGES DURING SOFTWARE APPLICATION RUNTIME AND APPLICATION MODIFICATION BASED ON STATE CHANGES

BACKGROUND

Producers of software applications, or systems, do not have direct means to determine states changes of software elements in the applications during actual runtimes of the software applications by end users. Existing tools, such as software analysis, logging, and debugging tools, are not designed to directly examine the state changes of software elements during runtime. Further, some of existing tools require code to be injected into the software application, which can alter the execution of the application, and such code must be removed from the software application prior to execution by end users. Additionally, there exists no means through which to manage the software application based on the actual state changes.

SUMMARY

Disclosed herein is a method for capturing of software element state changes during software application runtime, using one or more software sensors, and application modification based on the state changes, and a computer program product and system as specified in the independent claims. Embodiments of the present invention are given in the dependent claims. Embodiments of the present invention can be freely combined with each other if they are not mutually exclusive.

According to an embodiment of the present invention, in capturing software element state changes during software application runtime, a computing device executes a software application. The software application includes a set of one or more software sensors integrated within executable code of the software application. The set of one or more software sensors correspond to a set of one or more software elements in the software application. During runtime of the software application, a given software sensor of the set of the one or more software sensors corresponding to a given software element of the set of one or more software elements continuously determines whether the given software element corresponding to the given software sensor changes state. In response to determining that the given software element corresponding to the given software sensor changes state, the given software sensor captures the current state of the given software element and stores the current state of the given software element. An application control module associated with the software application obtains state data stored by the set of the one or more software sensors. The application control module determines a set of one or more commands for modifying a behavior of the software application based on an analysis of the state data and executes the set of one or more commands.

DETAILED DESCRIPTION

Exemplary embodiments of the present invention provide software sensors for capturing the state changes of corresponding software elements in a software application during runtime. "Software sensors", as used herein, refer to extended programming language constructs which are developed as part of the software application, i.e., not foreign code injected into the software application. The specific programming language grammar or syntax extension for providing software sensors depends upon the specific nature of a programming language. Once developed in the software application, the software sensors are integrated within the executable code of the software application and are part of the programming language grammar. Custom or manually created code outside of the programming language grammar is thus avoided. The software sensors are always present in the software application and always have a state. During runtime of the software application, each software sensor continuously captures and stores the current state of its corresponding software elements without the need for additional controls or commands. The stored state data are accessible by a computing device, where the state data can be collected for further analysis.

Figure 1:
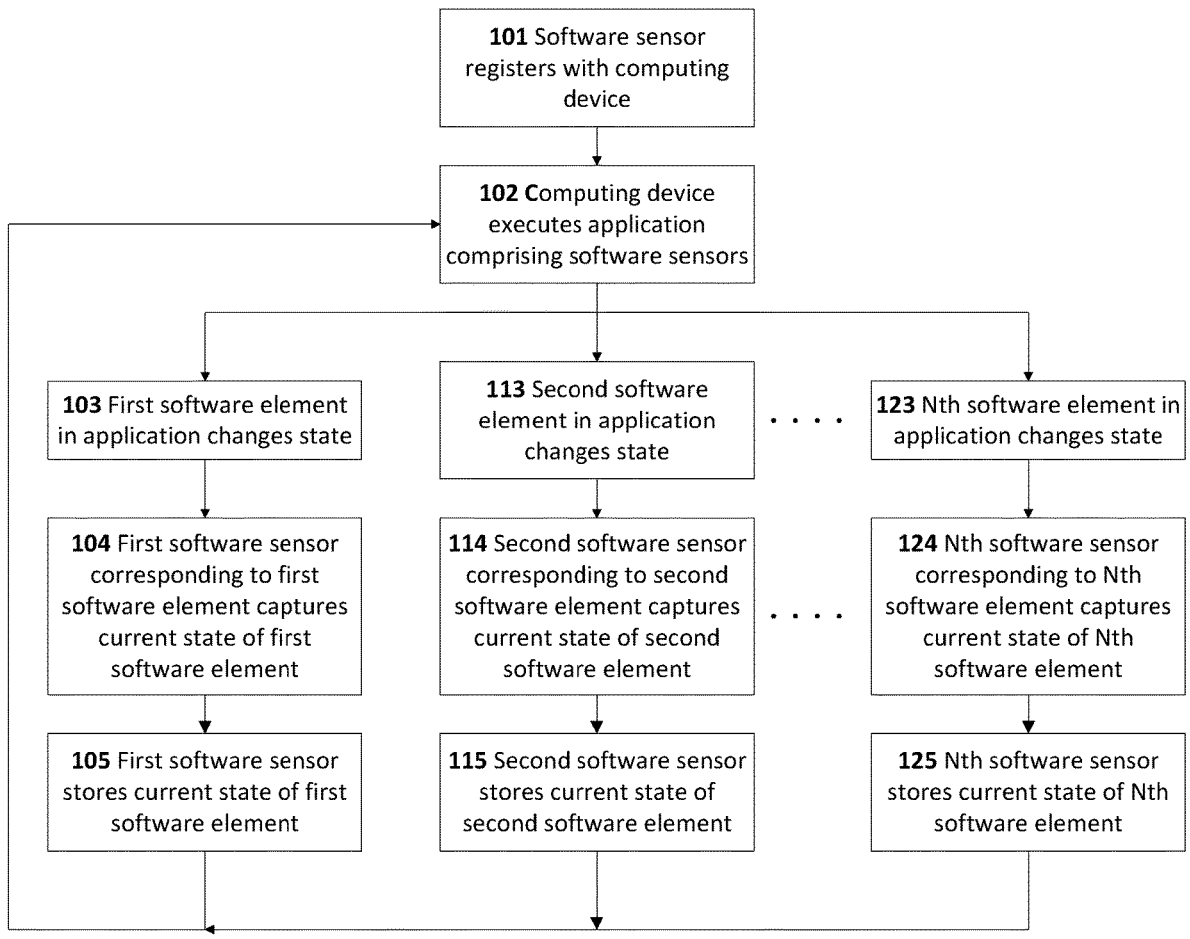
FIG. 1 illustrates a method for capturing of software element state changes during software application runtime, using one or more software sensors, according to an exemplary embodiment.

FIG. 1 illustrates a method for capturing software element state changes during software application runtime, using one or more software sensors, according to an exemplary embodiment. In some embodiments, each software sensor registers with a computing device (101). In this way, the computing device knows what software sensor state data can be available. A software application at the computing device executes the software application which comprises one or more software sensors (102), each software sensor corresponding to a software element in the software application. During the software application runtime, each software sensor continuously captures the current state of its corresponding software element. When a first software element in the software application changes state (103), a first software sensor corresponding to the first software element captures the current state of the first software element (104), i.e., the first software sensor captures the state change of the first software element and stores the current state of the first software element (105). Similarly, when a second software element in the software application changes state (113), a second software sensor corresponding to the second software element captures the current state of the second software element (1014 and stores the current state of the second software element (115). Any remaining N software sensor corresponding to an Nth software element similarly captures the current state of the Nth software element and stores the current state of the Nth software element (123-125). The stored state data of the software elements are accessible by the computing device, where the state data can be collected for analysis, as described further below. Except for capturing and storing a state change, a software sensor according to the present invention does not otherwise change the software application execution.

In some embodiments, types of software sensors include, but are not limited to: reusable scope element sensors (e.g. functions, procedures, critical sections); object sensors; state machine sensors; and thread sensors. Each software sensor type captures the current state of a specific type of software element in a software application. A function software sensor, for example, captures the current state of a corresponding function in the software application with each entry into or exit from this function. An object software sensor captures the current state of a corresponding object in the software application when this object is created or destroyed. A critical section software sensor captures the state of a corresponding critical section of the software application with each entry into or exit from the critical section. A state machine software sensor captures the state of a plurality of states of a corresponding state machine in the software application. A thread software sensor captures the current state of a corresponding thread in the software application when the thread is created or terminated. Other types of software sensors capturing the current state of other types of software elements may be implemented without departing from the spirit and scope of the present invention.

Figure 2:
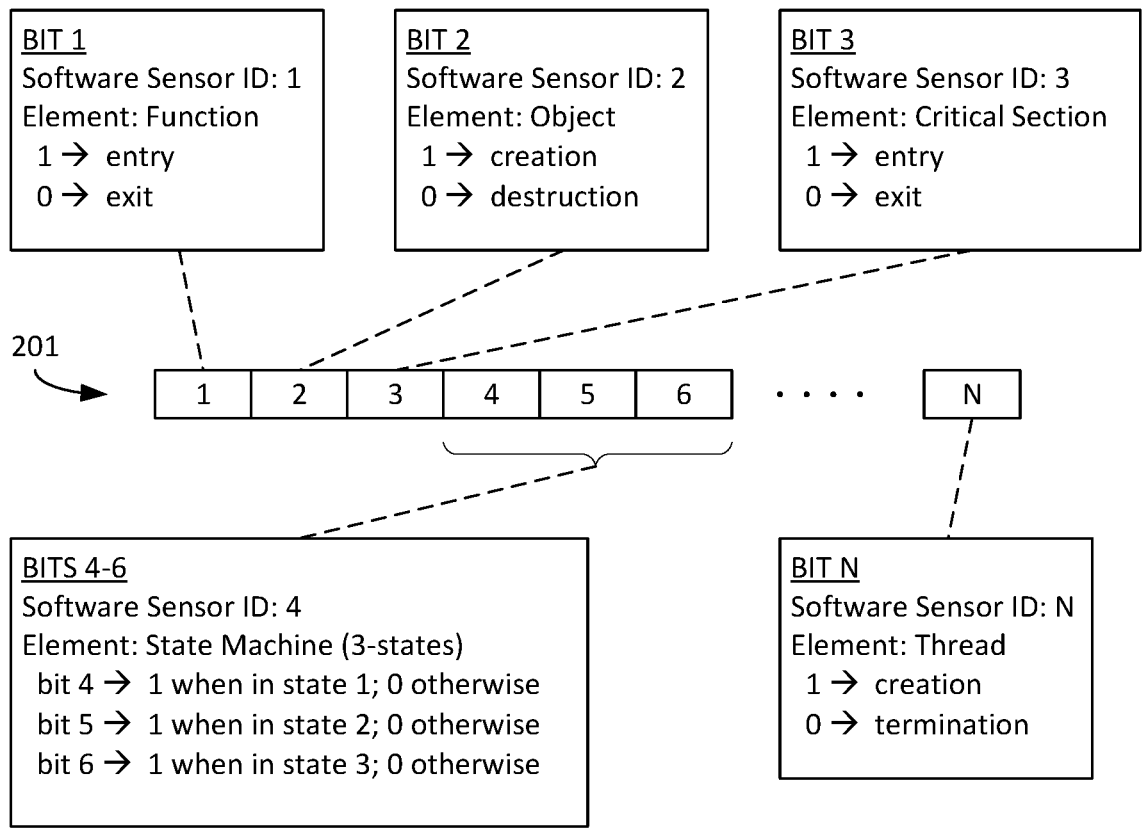
FIG. 2 illustrates some software sensors according to an exemplary embodiment.

FIG. 2 illustrates some software sensors according to an exemplary embodiment. In this exemplary embodiment, a bit table 201 is used to store the current states of software elements as captured by the software sensors. Each software sensor is assigned a unique software sensor identifier and mapped to one or more bits in the bit table 201. For example, as illustrated in FIG. 2, Bit 1 is mapped to software sensor 1 which corresponds to a function in the software application. Bit 1 is set (or "flipped") to '1' with each function entry and set to '0[ with each function exit. Bit 2 is mapped to software sensor 2 which corresponds to an object in the software application. Bit 2 is set to '1' when the object is created and set to '0' when the object is destroyed. Bit 3 is mapped to software sensor 3 which corresponds to a critical section in the software application. Bit 3 is set to '1' when the runtime enters the critical section and set to '0' when the runtime exists the critical section. Bits 4-6 are mapped to software sensor 4 which corresponds to a 3-state state machine in the software application. Each bit 4-6 is mapped to a possible state of the state machine. Bit 4 is set to '1' when the state machine changes to state 1 and is set to '0' otherwise. Bit 5 is set to '1' when the state machine changes to state 2 and is set to '0' otherwise. Bit 6 is set to '1' when the state machine changes to state 3 and is set to '0' otherwise. Bit N is mapped to software sensor N which corresponds to a thread in the software application. Bit N is set to '1' when the thread is created and set to '0' when the thread is terminated. Although the software sensors are illustrated as bits, other data structures may be used without departing from the spirit and scope of the present invention.

Figure 3:
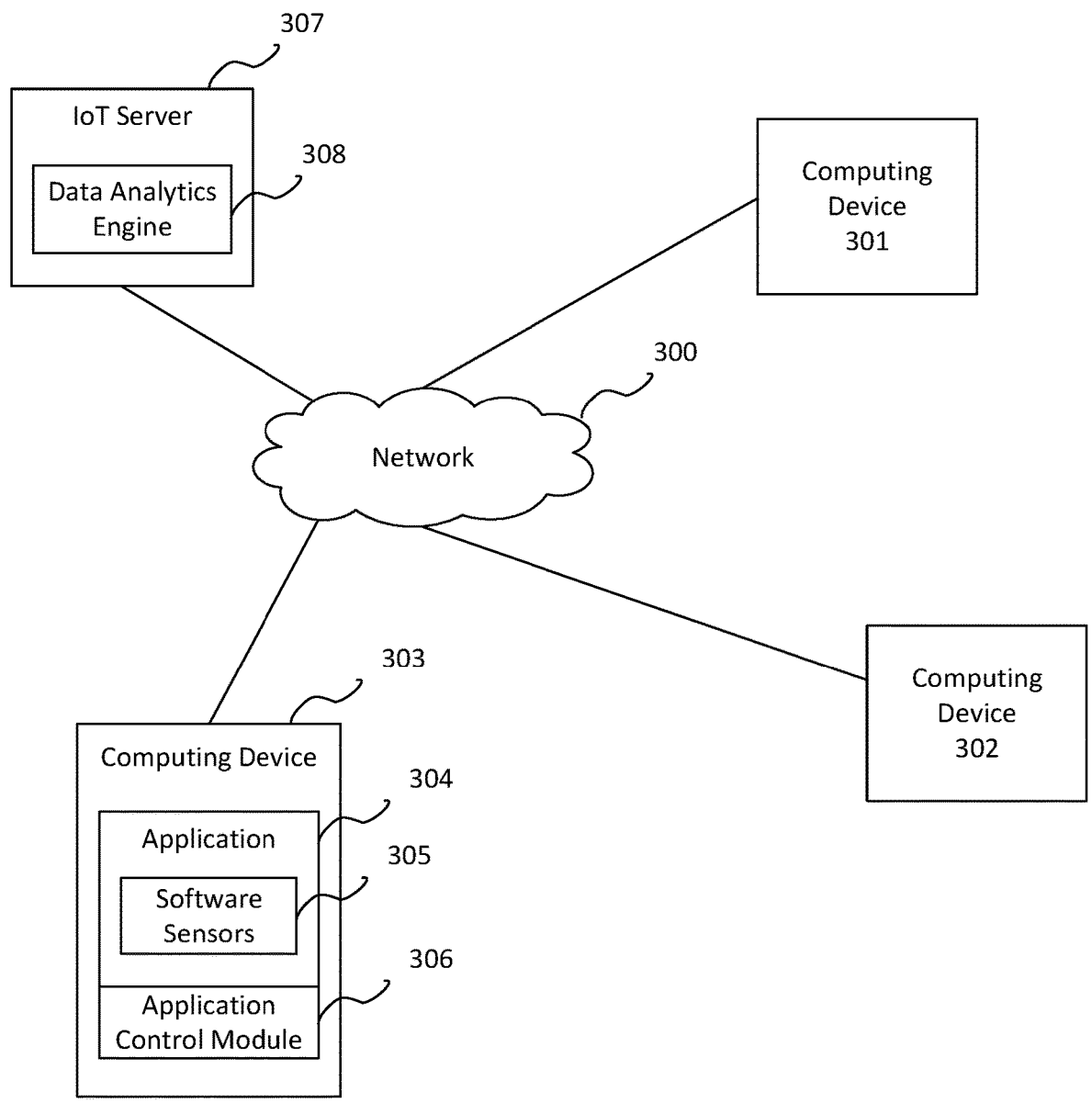
FIG. 3 illustrates a computing network in which some embodiments of the present invention reside.

FIG. 3 illustrates a computing network in which some embodiments of the present invention reside. The computing network 300 includes one or more computing devices, 301-303, capable of communicating with each other over the network 300. In some embodiments, the computing network 300 is an Internet of Things (IoT) network, where the computing devices (301-303) comprise a system of interrelated components or subsystems that are able to transfer and share data. Any of the computing devices (e.g. 303) is configured to execute a software application 304 with a set of one or more software sensors 305 integrated within the executable code of the software application 304. The software sensors 305 in the software application 304 register with the computing device 303. As the software application 304) executes at the computing device 303, the software sensors 305 in the software application 304 capture and store the current state of their respective corresponding software elements, in the manner set forth above with reference to FIG. 1. In some embodiments, the software application 304 further includes an application control module 306 residing within the application 304. The application control module 306 is embedded within the code of the software application 304 but, unlike the software sensors 305, is separate from (i.e., not integrated within) the executable code of the software application 304. During runtime, the application control module 306 is executed on a separate process thread from the application 304 execution thread. Alternatively, the application control module 306 is a separate software application that interacts with the application 304 via an application programming interface (API). The specific application control module 306 is configured to be associated with the specific software application 304. The application control module 306 is configured with the capability to modify the behavior of the associated application 304 as specified by a set of one or more commands. The set of commands are generated according to an analysis of the state data as captured and stored by the software sensors 305, as described further below.

Figure 4:
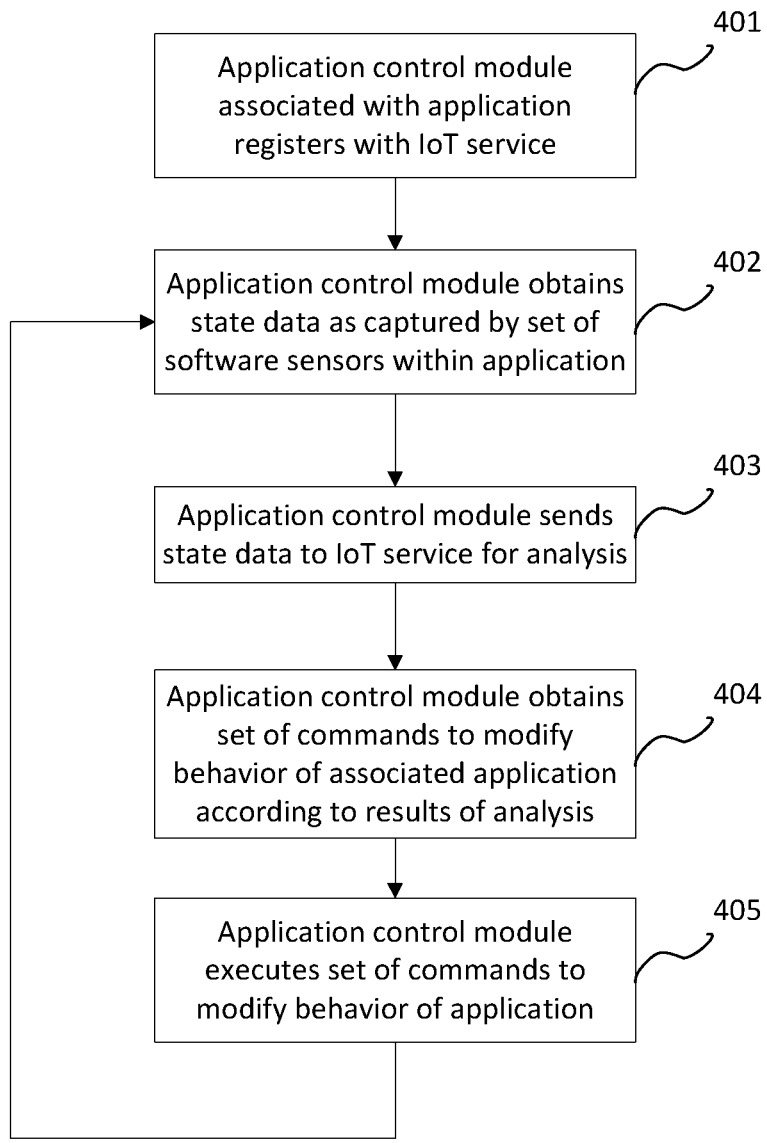
FIG. 4 illustrates a method for modifying application behavior using software sensor data according to exemplary embodiments of the present invention.

FIG. 4 illustrates a method for modifying application behavior using software sensor state data according to exemplary embodiments of the present invention. Referring to both FIGS. 3 and 4, the application control module 306 associated with the application 304 at the computing device 303 registers with an IoT service (401). The IoT service can include functionality provided by an IoT server 307. The IoT server 307 includes a data analytics engine 308 configured to receive software sensor state data and to analyze or interpret the state data. The application control module 306 obtains state data as captured and stored by the software sensors 305 in the application 304 (402). Assuming that the state data captured by the software sensors 305 are stored in a bit table 201 at the computing device 303, as illustrated in FIG. 2, the application control module 306 obtains the state data by reading the values of the bits in the bit table 201. In some embodiments, the software sensor state data includes, but are not limited to, any combination of the following attributes: a software sensor event type; a software sensor type; a software sensor identifier; a state (read from the bit table 201); and an event time stamp. The application control module 306 can obtain the state data over a period of time, which represents a history of state changes for the software elements in the application 304. The application control module 306 sends the state data to the IoT service for analysis (403). The application control module 306, in response to the state data, obtains a set of one or more commands to modify the behavior of the associated application 304 according to the results of the analysis by the IoT service (404). The application control module 306 executes the set of commands to modify the behavior of the associated application 304.

In some embodiments, the application control module 306 sends the state data to the IoT server 307, where the data analytics engine 308 analyzes the state data and determines whether the behavior of the application 304 is to be modified based on the results of the analysis. When the IoT server 307 determines that the behavior of the application 304 is to be modified, the IoT server 307 generates the set of commands to modify the behavior of the application 304 and sends the set of commands to the specific application control module 306 associated with the specific application 304. Since the state data is collected by the software sensors integrated within the specific application 305, it is the behavior of the specific application 305 that is modified.

In some embodiments, some portion of the logic for determining whether the behavior of the application 304 is to be modified can reside in the application control module 306. The application control module 306 sends the state data to the IoT server 307, where the data analytics engine 308 analyzes the state data and returns the results of the analysis to the application control module 306. The application control module 306 receives the results of the analysis from the IoT server 307, and the logic at the application control module 306 determines whether and what behavior of the application 304 is to be modified. The application control module 306 then generates and executes the set of commands to modify the behavior of the application 304.

In some embodiments, the computing device 303 includes multiple applications that include software sensors, where each specific application is associated with a specific application control module. The computing device 303 functions as an edge device, where the computing device 303 aggregates state data obtained by the multiple application control modules 306 and sends the aggregated state data to the IoT server 307 for analysis. The computing device 303 then receives a set of one or more commands from the IoT server 307 to modify the behavior of one or more of the applications. Each command is configured to modify the behavior of a specific application. In some embodiments, the computing device 303 includes some portion of the logic for determining whether the behavior of a specific application is to be modified, based on the results of the analysis by the data analytics engine 308. The computing device 303 forwards each command in the set of commands to the specific application control module associated with the specific application to which the command is directed. The specific application control module then executes the command to modify the behavior of the specific application to which it is associated. The behavior of each application can then be modified independently of the others. Alternatively, one of the application control modules functions as an edge device, where this application control module aggregates state data obtained by itself and other application control modules 306 and sends the aggregated state data to the IoT server 307 for analysis.

For example, the software sensor state data may be used to automate application responses to end user during the software application runtime. The computing device 303, or IoT server 307, may use this information to determine what features of an application is used or not used by end users and when. The behavior of the application is then modified such that features more often used by end users are enabled under certain conditions and/or features less often used by end users are disabled under certain conditions. By modifying the behavior of the application in this manner, the efficiency in the allocation of computing resources is increased.

Embodiments of the software sensor 305, described above, provide a direct means to determine state changes of software elements in a software application 304 during runtime. The ability to determine state changes during runtime provides the computing device 303 or the IoT server 307 a means for determining which features, components, and elements of the software application 304 is most important or highly used by end users. Further, the application control module 306 "decouples" its associated application 304 from the computer device 303, where the application 304 is able to register directly with an IoT service without reliance on the registration of the computing device 303 on which the application 304 executes. The application control module 306 thus functions as a "software device" in that the application control module 306 interacts with the IoT service in the same manner, and using the same protocols, as a registered hardware device. This differs from prior art software applications running on a registered hardware device as the prior art software is not able to register directly with the IoT service and any interaction must occur through the registered hardware device. Thus, the application control module 306 allows an application 304 to run on any computing device and to interact with the IoT service without the need for the computing device to be a registered device with the IoT service.

Figure 5:
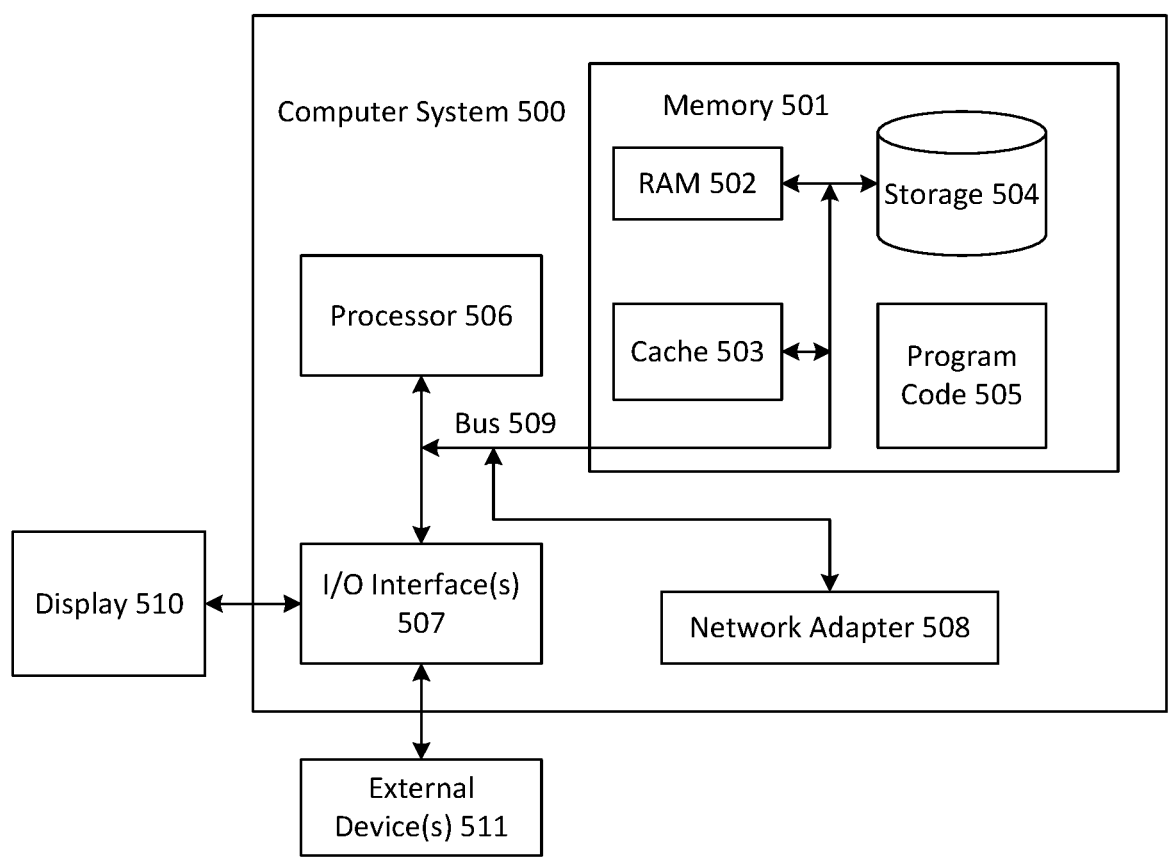
FIG. 5 illustrates a computer system, one or more of which implements the first computing device, the second computing devices, and/or the IoT server, according to an exemplary embodiment of the present invention.

FIG. 5 illustrates a computer system, one or more of which implements the computing device 303 and/or the IoT server 305 according to an exemplary embodiment of the present invention. The computer system 500 is operationally coupled to a processor or processing units 506, a memory 501, and a bus 509 that couples various system components, including the memory 501 to the processor 506. The bus 509 represents one or more of any of several types of bus structure, including a memory bus or memory controller, a peripheral bus, an accelerated graphics port, and a processor or local bus using any of a variety of bus architectures. The memory 501 may include computer readable media in the form of volatile memory, such as random access memory (RAM) 502 or cache memory 503, or non-volatile storage media 504. The memory 501 may include at least one program product having a set of at least one program code module 505 that are configured to carry out the functions of embodiment of the present invention when executed by the processor 506. The computer system 500 may also communicate with one or more external devices 511, such as a display 510, via I/O interfaces 507. The computer system 400 may communicate with one or more networks via network adapter 508.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capturing software element state changes during software application runtime, implemented by a processor of a computing device, comprising:

executing the software application, the software application comprising a set of one or more software sensors integrated within executable code of the software application, the set of one or more software sensors corresponding to a set of one or more software elements in the software application;

during runtime of the software application, a given software sensor of the set of the one or more software sensors corresponding to a given software element of the set of one or more software elements:

continuously determines whether the given software element corresponding to the given software sensor changes state;

in response to determining that the given software element corresponding to the given software sensor changes state, captures the current state of the given software element; and stores the current state of the given software element;

obtaining, by an application control module associated with the software application, state data stored by the set of the one or more software sensors;

determining, by the application control module, a set of one or more commands for modifying a behavior of the software application based on an analysis of the state data; and executing, by the application control module, the set of one or more commands, wherein the set of the one or more software sensors is mapped to one or more bits in a bit table, wherein the capturing of the current state of the given software element comprises: setting a bit mapped to the given software sensor according to the current state of the given software element by the given software sensor, wherein the obtaining of the state data stored by the set of the one or more software sensors comprises: reading the bit mapped to the given software element by the application control module.

2. The method of claim 1, wherein the set of the one or more software sensors comprises a set of extended software programming language constructs developed as part of the software application.

3. The method of claim 1, wherein the given software element comprises a reusable scope element, wherein the determining whether the given software element corresponding to the given software sensor changes state and the capturing of the current state of the given software element comprises:

determining an entry or an exit of the reusable scope element during the runtime of the software application; and in response to determining the entry or the exit of the reusable scope element, capturing a change in the current state of the reusable scope element.

4. The method of claim 1, wherein the given software element comprises an object, wherein the determining whether the given software element corresponding to the given software sensor changes state and the capturing of the current state of the given software element comprises:

determining a creation or a destruction of the object during the runtime of the software application; and in response to determining the creation or the destruction of the object, capturing a change in the current state of the object.

5. The method of claim 1, wherein the given software element comprises a state machine, wherein the determining whether the given software element corresponding to the software sensor changes state and the capturing of the current state of the given software element comprises:

determining a change in a state of the state machine during the runtime of the software application; and in response to determining the change in the state of the state machine, capturing a current state of the state machine.

6. The method of claim 1, wherein the given software element comprises a thread, wherein the determining whether the given software element corresponding to the given software sensor changes state and the capturing of the current state of the given software element comprises:

determining a creation or a termination of the thread during the runtime of the software application; and in response to determining the creation or the termination of the thread, capturing a change in the current state of the thread.

7. A computer program product for capturing software element state changes during software application runtime, the computer program product comprising a computer readable storage medium having program instructions embodied therewith, the program instructions executable by a processor to cause the processor to:

execute the software application, the software application comprising a set of one or more software sensors integrated within executable code of the software application, the set of one or more software sensors corresponding to a set of one or more software elements in the software application;

during runtime of the software application, a given software sensor of the set of the one or more software sensors corresponding to a given software element of the set of one or more software elements:

continuously determines whether the given software element corresponding to the given software sensor changes state;

in response to determining that the given software element corresponding to the given software sensor changes state, captures the current state of the given software element; and stores the current state of the given software element;

obtain, by an application control module associated with the software application, state data stored by the set of the one or more software sensors;

determine, by the application control module, a set of one or more commands for modifying a behavior of the software application based on an analysis of the state data; and execute, by the application control module, the set of one or more commands, wherein the set of the one or more software sensors is mapped to one or more bits in a bit table, wherein the capturing of the current state of the given software element comprises: set a bit mapped to the given software sensor according to the current state of the given software element by the given software sensor, wherein the obtaining of the state data stored by the set of the one or more software sensors comprises: read the bit mapped to the given software element by the application control module.

8. The computer program product of claim 7, wherein the set of the one or more software sensors comprises a set of extended software programming language constructs developed as part of the software application.

9. The computer program product of claim 7, wherein the given software element comprises a reusable scope element, wherein the determining whether the given software element corresponding to the given software sensor changes state and the capturing of the current state of the given software element comprises:

determine an entry or an exit of the reusable scope element during the runtime of the software application; and in response to determining the entry or the exit of the reusable scope element, capture a change in the current state of the reusable scope element.

10. The computer program product of claim 7, wherein the given software element comprises an object, wherein the determining whether the given software element corresponding to the given software sensor changes state and the capturing of the current state of the given software element comprises:

determine a creation or a destruction of the object during the runtime of the software application; and in response to determining the creation or the destruction of the object, capture a change in the current state of the object.

11. The computer program product of claim 7, wherein the given software element comprises a state machine, wherein the determining whether the given software element corresponding to the software sensor changes state and the capturing of the current state of the given software element comprises:
- determine a change in a state of the state machine during the runtime of the software application; and
- in response to determining the change in the state of the state machine, capture a current state of the state machine.

12. The computer program product of claim 7, wherein the given software element comprises a thread, wherein the determining whether the given software element corresponding to the given software sensor changes state and the capturing of the current state of the given software element comprises:
- determine a creation or a termination of the thread during the runtime of the software application; and
- in response to determining the creation or the termination of the thread, capture a change in the current state of the thread.

13. A system comprising:
a processor; and
a computer readable storage medium having program instructions embodied therewith, the program instructions executable by a processor to cause the processor to:
execute the software application, the software application comprising a set of one or more software sensors integrated within executable code of the software application, the set of one or more software sensors corresponding to a set of one or more software elements in the software application;
during runtime of the software application, a given software sensor of the set of the one or more software sensors corresponding to a given software element of the set of one or more software elements:
- continuously determines whether the given software element corresponding to the given software sensor changes state;
- in response to determining that the given software element corresponding to the given software sensor changes state, captures the current state of the given software element; and
- stores the current state of the given software element;
obtain, by an application control module associated with the software application, state data stored by the set of the one or more software sensors;
determine, by the application control module, a set of one or more commands for modifying a behavior of the software application based on an analysis of the state data; and
execute, by the application control module, the set of one or more commands, wherein the set of the one or more software sensors is mapped to one or more bits in a bit table,
wherein the capturing of the current state of the given software element comprises: set a bit mapped to the given software sensor according to the current state of the given software element by the given software sensor,
wherein the obtaining of the state data stored by the set of the one or more software sensors comprises: read the bit mapped to the given software element by the application control module.

14. The system of claim 13, wherein the set of the one or more software sensors comprises a set of extended software programming language constructs developed as part of the software application.

15. The system of claim 13, wherein the given software element comprises a reusable scope element, wherein the determining whether the given software element corresponding to the given software sensor changes state and the capturing of the current state of the given software element comprises:
- determine an entry or an exit of the reusable scope element during the runtime of the software application; and
- in response to determining the entry or the exit of the reusable scope element, capture a change in the current state of the reusable scope element.

16. The system of claim 13, wherein the given software element comprises an object, wherein the determining whether the given software element corresponding to the given software sensor changes state and the capturing of the current state of the given software element comprises:
- determine a creation or a destruction of the object during the runtime of the software application; and
- in response to determining the creation or the destruction of the object, capture a change in the current state of the object.

17. The system of claim 13, wherein the given software element comprises a state machine, wherein the determining whether the given software element corresponding to the software sensor changes state and the capturing of the current state of the given software element comprises:
- determine a change in a state of the state machine during the runtime of the software application; and
- in response to determining the change in the state of the state machine, capture a current state of the state machine.

18. The system of claim 13, wherein the given software element comprises a thread, wherein the determining whether the given software element corresponding to the given software sensor changes state and the capturing of the current state of the given software element comprises:
- determine a creation or a termination of the thread during the runtime of the software application; and
- in response to determining the creation or the termination of the thread, capture a change in the current state of the thread.

* * * * *